United States Patent Office 3,556,932
Patented Jan. 19, 1971

3,556,932
WATER-SOLUBLE, IONIC, GLYOXYLATED, VINYLAMIDE, WET-STRENGTH RESIN AND PAPER MADE THEREWITH
Anthony Thomas Coscia, South Norwalk, and Laurence Lyman Williams, Stamford, Conn., assignors to American Cyanamid Company, Stamford, Conn., a corporation of Maine
No Drawing. Continuation-in-part of application Ser. No. 471,463, July 12, 1965. This application July 17, 1968, Ser. No. 745,486
Int. Cl. C08g 9/02; D21h 3/52
U.S. Cl. 162—166                  15 Claims

ABSTRACT OF THE DISCLOSURE

The ionic-hydrophilic vinylamide polymers which have sufficient —CHOHCHO substituents to be thermosetting possess the property of providing paper with wet and dry strength rapidly at neutral pH, with or without exposure to thermosetting temperatures. The paper rapidly becomes a pulp suitable for re-use when slurried in water having a mildly alkaline pH. Blends of ionic-hydrophilic vinylamide polymers and glyoxal are storage-stable when dry, yet form the above-described thermosetting polymers when they are dissolved in water at room temperature and the resulting solution is aged.

---

This is a continuation-in-part of our copending application Ser. No. 471,463, filed July 12, 1965, and now abandoned.

The present invention relates to new ionic hydrophilic thermosetting vinylamide polymers, to dry blends of reagents which when dissolved in water readily react to form said polymers, to processes for the manufacture of said polymers, to paper of improved wet strength resulting from a content of said polymers in adsorbed and reacted state, and to methods for pulping said paper.

Ionic water-soluble polymers which have the property of imparting wet-strength to paper are important specialties of the paper-making art. Certain of these polymers (which may be anionic or cationic and which may be in colloidal state) develop their wet strength only under acid conditions, cf. U.S. Pats. Nos. 2,345,543; 2,582,840 and 2,596,014, as a result of which the paper-making equipment is subject to corrosive conditions and the paper undergoes premature embrittlement.

The discovery has now been made that ionic water-soluble vinylamide polymers which are thermosetting by reason of a reacted content of glyoxal (hereinafter termed for convenience "polyvinylamides which have sufficient content of —CHOHCHO substituents to be thermosetting") possess certain novel and beneficial properties in preferred embodiments as follows:

(1) The polymers are excellent strengthening agents for paper. They thermoset or "cure" very rapidly at common paper-making temperatures at about neutral pH (pH 6–7), and impart excellent wet strength per unit weight of polymer.

(2) The polymers impart very satisfactory wet strength at pH values over the broad range which extends from pH 4 to pH 8. With these polymers, therefore, accurate control of pH is not necessary during the paper making operation, and wet strength paper made therewith need not develop acid tendering on aging.

(3) The polymers impart excellent dry strength along with wet strength.

(4) The polymers can be easily prepared both in cationic and in anionic state from presently available raw materials. These cationic polymers are self-substantive to cellulose fibers in aqueous suspension, and the anionic polymer can be deposited on such fibers without difficulty by the use of alum. As a result, paper manufacturers using these polymers need not learn any new techniques.

(5) The polymers develop substantially all of their wet and dry strength while paper passes through the drying section of a paper-making machine at 190°–250° F. (generally less than a minute), i.e., while the wet web is drying, and it is unnecessary to subject the paper thus made to a longer or higher-temperature cure. So easily do the polymers develop their wet-strengthening properties that usually substantially all of their dry and wet strength is developed when the drying temperature is in the range of 70°–90° F.

(6) Dry blends of the two components from which the polymers (the polyvinylamide and glyoxal) are made are stable for many months, yet the polymers of the present invention are produced when these blends are dissolved in water and the resulting solutions are aged at room temperature. As a result, the components of the polymer can be shipped and stored in intimate uniform admixture in dry state, permitting the polymer to be prepared as needed at the site of paper manufacture.

(7) Paper of wet strength resulting from a content of the polymers of the present invention possesses the important and advantageous property of losing a part of its wet strength when soaked in water for a moderate length of time. For many kinds of paper (e.g. facial and other tissues, and paper towelling) permanent wet strength is a positive disadvantage. The paper of the present invention, in addition, possesses the important and advantageous property of losing substantially all of its wet strength rapidly when soaked in alkaline water. As a result, paper broke produced as an incident to the manufacture of paper according to the present invention can be pulped easily and cheaply, without harm to the fibers, without use of the acids, boiling water, steam jets or oxidizing salts heretofore customarily used; cf. U.S. Pat. No. 2,872,313.

The polymers of the present invention are ionic water-soluble polyvinylamides having sufficient —CHOHCHO substituents to be thermosetting.

The amount of ionic component in the polymers is that which is sufficient to render them self-substantive to cellulose fibers in aqueous suspensions (in the case of the cationic polymers of the present invention), or to render them precipitable on cellulose fibers in aqueous suspensions by the action of alum (in the case of anionic polymers of the present invention). The proportion of ionic or ionic groupings which need be present in the polymers of the present invention is small, generally less than 10 mol percent of the vinyl components of the polymer; if desired, however, a larger proportion may be present.

Whether or not sufficient ionic groupings (cationic or anionic) are present can be determined in any instance by laboratory trial, employing the methods shown in the examples below. Sufficient ionic groupings are present when upwards of 50% of the amount of polymer in any one instance is retained by the fibers (as determined by analysis of the fibers for their nitrogen content before and after treatment).

A few ionic groupings per macromolecule are generally sufficient, and perhaps even one ionic substituent per macromolecule is enough. However, it is preferable for the polymers to contain between 1 and 10 ionic groupings per 100 chain carbon atoms (e.g., 4 to 10 ionic substituents per macromolecule of 200 monomer units) because in this range the danger of too few ionic groups being present is generally avoided, and consumption of the often more costly ionic component is minimized. The term "groupings" includes substituents.

The vinylamide content of the polymers of the present invention provides the sites to which the glyoxal substituents (hereinafter designated "—CHOHCHO substituents") are attached. The minimum proportion of vinylamide units which should be present in any instance can be determined by laboratory trial; the proportion of these substituents should be sufficient so that the polymer (with —CHOHCHO substituents attached) is thermosetting, i.e., so that a film of the polymer laid down from water solution on a glass plate and heated for 5 minutes at 105° C. is insoluble in water at room temperature.

The vinylamide units provide sites to which the —CHOHCHO substituents are attached and with which these substituents react during the thermosetting reaction.

About 10 mol percent of vinylamide units (based on the total number of vinyl monomer units present) appear to be the minimum needed to provide the necessary number of sites. It is usually advantageous for the proportion of these units to be much higher, larger proportions promoting the wet-strengthening properties of the polymer without conferring any significant off-setting disadvantage and avoiding the loss resulting from the presence of too low a proportion of these groups. It thus appears better for the vinylamide units to be present in major amount, i.e., in amount larger than 50 mol percent, and better still for the proportion of these units to be in excess of 75 mol percent. The remaining units in the polymers of the present invention are the units which confer ionic properties upon the polymer, or those which act as diluents or spacers, or which confer special properties, for example, improved or diminished water-solubility.

Excellent results have been obtained from the cationic water-soluble reaction products of glyoxal with polymers composed of acrylamide and diallyldimethyl ammonium chloride residues in molar ratio between 99:1 and 75:25; with polymers composed of methacrylamide and 2-methyl-5-vinylpyridine in 99:1 to 50:50 molar ratio; and cationic water-soluble polymers composed of vinyl acetate, acrylamide and diallyldimethyl ammonium chloride in about 8:40:2 molar ratio.

The polymers of the present invention are prepared from vinylamides which may have any molecular weight up to the point where they do not dissolve in water but instead merely form non-fluid gels. Such polymers are adequately water-soluble at molecular weights in the range of 100,000–1,000,000. Solutions thereof in water are not unduly viscous, and evidently these polymers may usefully possess still higher molecular weights. However, lower molecular weight polymers are more easily handled (because of their lower viscosity and easier water-dilutability) and when reacted with glyoxal they possess better storage stability. For these reasons, it is preferred to employ polymers having molecular weights less than 25,000 as starting materials. Such polymers contain roughly 200–300 monomer units per average macromolecule, of which about 150–200 units are vinylamide units.

The polymers of the present invention, as freshly prepared, are water-soluble and in most instances aqueous solutions thereof are clear, colorless, and sparkling and free from haze. The latter indicates that the polymeric molecules are substantially entirely hydrophilic and are of sub-colloidal dimensions. On standing at room or elevated temperature at 2%–5% solids, these solutions develop a blue opalescent haze having the appearance of that described in U.S. Patent No. 2,345,543, which shows that the macromolecules have attained colloidal dimensions, evidently as the result of inter-molecular condensations.

In certain instances aqueous solutions of the polymers are hazy when freshly prepared. The cause of this haze has not been ascertained, but is generally caused by the presence of macromolecules which are not substantially entirely hydrophilic but which are on the borderline between being hydrophilic and hydrophobic (insoluble). Such molecules contain hydrophobic linkages, for example, the residues of styrene, acrylonitrile, octadecyl acrylate, N-octyl acrylamide, etc., in sufficient number to place them on the borderline between water-solubility and water insolubility. The haze may be composed of colloidal particles or of colloidal aggregates of sub-colloidal particles.

We have found that from the dimensional point of view, best wet strength is imparted by colloidal particles. In numerous instances we have found that the wet strengthening property of a polymer increases by 10% to 15% when it has grown to colloidal dimensions. This increase in efficiency is obtained merely by permitting the polymer solutions to age until they develop a colloidal haze.

The time required by solutions of polymers of the present invention to develop a colloidal haze varies widely, depending on such variables as the molecular weight of the polyvinylamide employed as raw material, the concentration of polymer in the solution, the temperature of the solution, and the pH of the solution. Most rapid development of the haze occurs when the starting polyamide, while clearly water-soluble, is of high molecular weight and contains hydrophobic substituents, when the concentration of polymer in the solution is high, and when the temperature and pH of the solution are high. Slow development of the colloid is favored by reversal of these conditions.

In perhaps their simples form the polymers of the present invention can be composed of units having the theoretical formulae

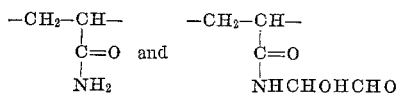

plus units which confer an ionic charge to the molecule. If desired, diluent units may be present, for example

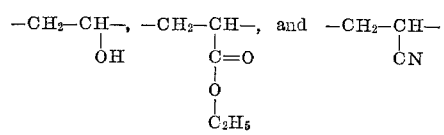

units. Such units are tolerated in small amounts. It will be understood that the polymers may also contain linkages formed when the —CHOHCHO substituents react with the

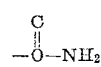

substituents, which occurs to a small extent during manufacture of the polymers.

In practice, the polymers of the present invention are generally most conveniently prepared by reacting a preformed ionic hydrophilic water-soluble polyvinylamide with sufficient glyoxal to form a water-soluble polymer which is thermosetting. Many suitable polyvinylamides for the purpose are known, some of which are commercially available.

Cationic polyvinylamides suitable for reaction with glyoxal to form polymers of the present invention include those which are produced by copolymerizing a water-soluble vinylamide with a vinyl water-soluble monomer which carries a positive electrostatic charge when dissolved in water, for example, 2-vinylpyridine, 2-vinyl-N-methylpyridinium chloride, diallyldimethyl ammonium chloride, (p-vinylphenyl)-trimethyl ammonium chloride, and 2-(dimethylamino) ethyl acrylate. Taking the latter compound as an example, the product polymer contains cationic

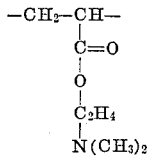

linkages. If desired, some or all of the tertiary nitrogen atoms therein can be quaternized, e.g., by reaction with dimethyl sulfate.

Alternatively, cationic polymers may be produced from non-ionic polyvinylamides, by converting part of the amide substituents thereof (which are non-ionic) to cationic substituents. One such polymer can be produced by treating polyacrylamide with an alkali metal hypohalite; part of the amide substituents are degraded by the Hofmann reaction to cationic amine substituents. For details of this procedure see House et al. U.S. Patent No. 2,729,560, which also discloses a number of other polyvinylamides which can be employed in place of polyacrylamide. Another example is the 90:10 molar ratio acrylamide:p-chloromethylstyrene copolymer which is converted to cationic state by quaternization of the chloromethyl substituents with trimethylamine. The trimethylamine can be replaced in part or in whole with triethanolamine or other water-soluble tertiary amine. The resulting polymer is composed of linkages having the theoretical formulae:

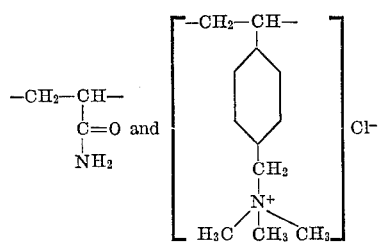

Alternatively still, cationic polymers can be prepared by polymerizing a water-soluble vinyl tertiary amine (for example, dimethylaminoethyl acrylate or vinylpyridine) with a water-soluble vinyl monomer copolymerizable therewith (for example, acylamide) thereby forming a water-soluble cationic polymer. The tertiary amine groups can then be converted into quaternary ammonium groups by reaction with methyl chloride, dimethyl sulfate, benzyl chloride, etc. in known manner, with enhancement of the cationic properties of the polymer. Moreover, polyacrylamide can be rendered cationic by reaction with a small amount of glycidyl dimethyl ammonium chloride.

Anionic polymers of the present invention can be prepared as follows.

According to one method, a water-soluble aldehyde-reactive vinylamide (for example acrylamide and crotonamide) is copolymerized with a water-soluble vinyl acidic material, for example, acrylic acid, methacrylic acid, maleic acid, and vinylbenzenesulfonic acid, and the copolymer is reacted with glyoxal. The resulting polymer is anionic and thermosetting.

According to another method, the anionic substituents are formed in situ in the polymer. Thus in one embodiment of this method polyacrylamide is subjected to partial hydrolysis, resulting in formation of a vinyl polymer which comprises

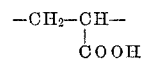

linkages, or an alkali metal salt thereof. Moreover, ethyl acrylate is copolymerized with a suitable aldehyde-reactive compound (for example acrylamide), and the resulting polymer is subjected to hydrolysis. The product contains (—$CH_2CHCONH_2$—) and

linkages, and is reacted with glyoxal to form a thermosetting polymer.

According to a third method, a non-ionic hydrophilic thermosetting polyacrylamide-glyoxal polymer is reacted with sodium or potassium bisulfite, which introduces —$SO_3K$ or —$SO_3Na$ substituents into the polymer thereby rendering it anionic.

The aforementioned copolymerizations may be performed by any convenient method for the copolymerization of water-soluble monomers.

The reaction of the parent polymer with glyoxal is conveniently performed by warming a dilute neutral or slightly alkaline aqueous solution of glyoxal and an ionic vinylamide polymer until a slight increase in viscosity is observed. The solution then contains a polymer according to the present invention and is ready for use. If desired, the solution can be cooled to room temperature and acidified; the resulting solution posssesses good stability.

The glyoxal reaction described above does not go to completion. For example, when a dilute aqueous solution of 25 mols of glyoxal and a 95:5 molar ratio acrylamide:diallyldimethyl ammonium chloride copolymer is warmed until a slight increase in viscosity occurs, about half of the glyoxal (as determined by dialysis) does not react at all but remains dissolved in the water. Of the remaining glyoxal, the largest part reacts to the extent of only one of its functionalities (so as to introduce —CHOHCHO substituents into the polymer). The remainder of the glyoxal (a very small amount) reacts to the extent of both its functionalities (so as to unite two polymeric molecules) causing the slight increase in viscosity referred to above.

The glyoxal which does not react at all remains in the white water during the papermaking operation and does not act as a wet-strengthening agent.

The minimum amount of glyoxal in the starting solution is such that the polymer product is thermosetting according to the test set forth above. A larger amount of glyoxal may be employed, but the increase in wet strength produced by such larger amount is minor.

In most instances the amount of glyoxal taken, and the duration of the time allowed the polyvinylamide to react with the glyoxal, should be such that the molar ratio of —CHOHCHO substituents to the glyoxal-reactive amide substituents in the polymer is at least 0.06:1. This is about the minimum proportion of active glyoxal substituents needed to produce practically useful wet strength efficiency. The ratio may be higher, and a ratio in the range of 0.10–0.20 appears to afford best wet strength efficiency.

The optimum amount of glyoxal to be taken in any instance is readily found by laboratory trial using the examples which follow as guides. As a starting point in most instances, one mol of glyoxal may be taken for every four vinylamide units present.

It is an important feature of the present invention that the glyoxal and the parent polymer may be pre-blended in apparently dry particulate state, the glyoxal being used in the form of its stable hydrate. The term "apparently dry" means that the blend contains substantially no free water so that it is free-flowing, i.e., so that substantially all of the water present is in chemically bound state. The blend may and advantageously does contain powdered inert water-bindive material which is adapted to maintain said blend dry in the event of accidental access of moisture or humid air, for example silica gel, magnesium sulfate, or sodium sulfate. Sodium sulfate is preferred because it is water-soluble, capable of absorbing 10 molecules of water, and compatible with papermill white water systems, and because it has a naturally neutral pH.

We have found that such blends, when contained in water-impermeable packaging are stable at room temperature, and yet the components of the blend can co-react within a few hours to form the desired thermosetting resin when merely dissolved in warm water. This is an important feature, because it permits the components to be shipped in dry bulk state by the manufacturer, over long distances if desired, and yet to be used in small quantities by the consumer, as needed, without need for elaborate equipment.

The polymers of the present invention are conveniently employed in the manufacture of paper as dilute aqueous solutions. The solutions can be usefully applied to preformed paper by the "tub" or impregnation method, but more conveniently are applied by adding the solutions directly to papermaking fibrous suspensions at any point in the papermaking system where wet-strength resins are customarily added.

The cationic polymers of the present invention are rapidly and substantively absorbed by the fibers at pH values within the range 3.5–8, and the use of retention aids is unnecessary. While best wet strength is achieved at low pH, very satisfactory wet strength is achieved with neutral pulps.

A substantial amount of wet strength is imparted when the amount of polymer adsorbed by the fibers is as little as 0.2% of the dry weight of the fibers, and evidently smaller amounts impart a significant amount of wet strength as well. The strengthening effect of the polymer increases over a broad range, up to at least 2% of the dry weight of the fibers.

The plateau range (the range over which amounts of polymer added to an aqueous suspension of cellulose paper-making fibers at a given pH produces negligible increases in wet strength) has not yet been ascertained for all fibers, but can be readily found by trial.

The anionic polymers are conveniently added in the same manner and in the same amount as the cationic agents, except that the use of retention agent is usually necessary. One suitable retention agent is alum, and this may be added in an effective amount prior to addition of the anionic polymer. If preferred, the alum may be added subsequent to addition of the polymer. In place of the alum there may be employed any of the known cationic retention aids, for example, the melamine-formaldehyde acid colloid of U.S. Pat. No. 2,345,543, the adipic acid-diethylenetriamine-epichlorohydrin resin of U.S. Pat. No. 2,926,154; polyethylenimine, and polyvinylpyridine quaternized with butyl bromide. When alum is used as the retention aid, the optimum pH of the suspension for adsorption of the polymer and for rapid development of its wet-strength properties is about 4–5.5.

The mechanism by which the polymer of the present invention produces such excellent wet- and dry-strength coupled with such remarkable ease of disintegration at elevated pH has not been ascertained, and we do not wish to be bound by any therory. However, our evidence indicates that the polymer produces its strengthening action by two different reaction: a chemical reaction with the cellulose, and a cross-linking reaction with itself.

The invention is described more in detail in the examples which follow. These examples constitute specific embodiments of the invention and are not to be construed as limitations thereon.

The following illustrates the preparation and properties as wet-strength agents for paper of a number of ionic, hydrophilic vinylamide polymers carrying a sufficient number of —CHOHCHO substituents to be thermosetting.

EXAMPLE 1

Acrylamide-diallyldimethyl ammonium chloride copolymer (97.8 mol percent acrylamide), glyoxal reacted Into a reaction vessel equipped with reflux condenser, dropping funnel, stirrer and thermometer are placed 75.5 g. of water, 34.0 g. of isopropyl alcohol, and a solution of 4.0 g. of diallyldimethyl ammonium chloride in 4.3 g. of water. To these materials at reflux are slowly added 80.8 g. (1.15 mol) of acrylamide dissolved in 83.4 g. of water and 0.4 g. of ammonium persulfate dissolved in 16.2 g. of water. The acrylamide: diallyldimethyl ammonium molar ratio is 97.8:2:2 Addition is complete in 100 minutes. The reaction mixture is refluxed for an additional two hours and is then cooled.

The product is a substantially linear non-thermosetting cationic polyacrylamide having a molecular weight in the range of 7,000–20,000 and is substantially composed of linkages having the theoretical formulae:

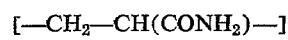

and

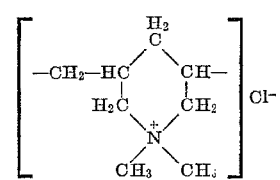

This polymer dissolves easily in water, forming a clear solution.

The solution is adjusted to pH 7.5 by addition of dilute sodium hydroxide or sulfuric acid, as required. There is then added sodium phosphate as buffer, followed by 42.0 g. of a 40% by weight solution of glyoxal in water. The solution is adjusted to 11% polymer solids by addition of water. The pH of the solution is adjusted to 8 and the pH is lowered to 7 as soon as a perceptible increase (i.e., an increase of 1 poise) occurs in the viscosity of the solution. The pH of the solution is then gradually lowered to keep the reaction progressing at a steady, moderate rate. When the polymer solution reaches a Gardner-Holdt viscosity of B–C as an 11% by weight solution at 30° C., the reaction is stopped by diluting the solution to 8% polymer solids, adjusting the pH of the solution to 3.5, and cooling the solution to room temperature.

Dialysis of a sample of the solution shows that only about half of the glyoxal reacts with the polyacrylamide. Of this, only a small amount reacts bifunctionally (i.e., as cross-linking agent) with the polyacrylamide; this is the cause of the small increase in viscosity noted above. The remainder of the glyoxal reacts monofunctionally (i.e., so as to form —CHOHCHO substituents on the polymer, probably attached to the amide groups thereof). The resulting polymer is cationic and water-soluble. In the solution, the weight of wholly unreacted glyoxal is about $\frac{1}{12}$ of the weight of the polymer. The ratio of the glyoxal substituent on the backbone to the amide substituent is about 0.12:1.

The thermosetting nature of the polymer is shown by coating a glass panel with an 11% by weight aqueous solution of the polymer, air-drying the panel, and baking the panel for 5 minutes at 90° C. The resulting film does not dissolve in water at pH 7 and 20° C.

Similar results are obtained when the molar ratio of the acrylamide to the diallyl dimethyl ammonium chloride is in the range of 99:1 to 75:25.

On standing the solution remains clear. Initially, samples which are removed and diluted to 2%–5% solids. However, as the aging progresses, the samples which are removed and which are diluted to 2%–5% yield hazy solutions, which show that the polymer therein is in colloidal state.

The polymer is substantially uncolored as prepared. It does not darken or acquire a color as it ages.

Paper made with a content of this paper is unusually bright compared to other wet strength papers, due to the absence of color in the polymer and the low capability of the polymer to attract into the paper iron, dirt, etc., from the white water.

EXAMPLE 2

Acryamide-acrylonitrile-diallyldimethyl ammonium chloride copolymer (75 mol percent acrylamide), glyoxal reacted The procedure of Example 1 is repeated, except that 20.2 g. of the acrylamide is replaced by 15.1 g. of acrylonitrile and the amount of the glyoxal solution which is added is increased to 48.3 g. The acrylamide:acrylonitrile:diallyldimethyl ammonium chloride molar ratio is 75:25:2, and the ratio of the —CHOHCHO substitutents to the amide substituents of the copolymer is approximately 0.17:1.

The initial copolymer is formed of linkages having the theoretical formulae shown in Example 1, plus the linkage having the theoretical formula —CH$_2$—CH(CN)—. Solutions of the polymer, as prepared, are usually hazy.

EXAMPLE 3

Methacrylamide-methylvinylpyridine copolymer (96.7 mol percent methacrylamide), glyoxal reacted Into the reaction vessel of Example 1 are placed 75 g. of water and 35 g. of isopropyl alcohol, and the mixture is heated to reflux. To this solution there are added separately but concurrently over 1.5 hours 4.0 g. of 2-methyl-5-vinyl pyridine and 85 g. of methacrylamide dissolved in 105 g. of water containing 0.5 g. of ammonium persulfate. The polymer is composed of linkages having the theoretical formulae

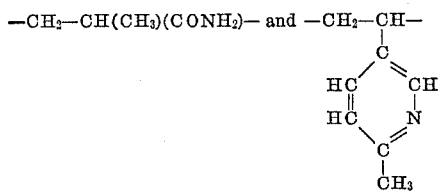

The product is diluted to 11% solids by weight, and adjusted to pH 7.5 with addition of buffer. There is then added 36.4 g. of 40% aqueous glyoxal solution, and the glyoxal is partially reacted with the polymer, all according to the method of Example 1. A thermosetting cationic water-soluble polymer is obtained, which is stabilized by acidification, cooling and dilution to 8% solids. The ratio of —CHOHCHO substituents to the amide substituents is in excess of 0.06:1.

EXAMPLE 4

Acrylamide-diallylmelamine copolymer (90 mol percent acrylamide), glyoxal reacted Into a flask provided with agitation, reflux condenser and electric heating mantle is placed 20.6 g. (0.1 mol) of diallylmelamine dissolved in dioxane, and to this is slowly added separately and concurrently a solution of 71 g. (1 mol) of acrylamide in dioxane and 0.5 g. of benzoyl peroxide dissolved in dioxane. The mixture is heated to 88° C. and cooling is applied to maintain the exotherm at 90° C. When the exotherm subsides, the flask is maintained at 100° C. for 90 minutes. The polymer is filtered off and is washed with dioxane; cf. U.S. Patent No. 3,077,430.

The copolymer is substantially composed of linkages having the theoretical formulae

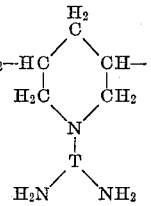

wherein T designates the triazine ring of melamine.

The copolymer is dissolved in water and the solution adjusted to 11% solids by addition of water. The solution is adjusted to pH 7.5. Sodium phosphate buffer and 43 g. of 40% aqueous glyoxal solution are added. The mixture is further processed by the method of Example 1. A polymer having similar properties is obtained.

EXAMPLE 5

Poly(vinylurea), glyoxal reacted

To a solution of 43 g. (1 mol) of polyvinylamine in 100 cc. of water is added 83 ml. of 12 N hydrochloric acid (1 mol), after which 81 g. (1 mol) of potassium cyanate is added. The mixture is reacted at 75° C. for 1 hour with slow agitation. The product is poly(vinylurea), substantially composed of linkages having the theoretical formulae —CH$_2$CH(NHCONH$_2$)—, and perhaps some few unaltered —CH$_2$CH(NH$_2$)— groups.

The syrup is diluted to 11% solids by addition of water and is adjusted to pH 7.5. Sodium phosphate buffer and 36 g. of a 40% solution of glyoxal in water are added. Processing is continued by the method of Example 1. A similar polymer containing

—CH$_2$CH(CONHCHOHCHO)

linkages is obtained.

EXAMPLE 6

Acrylamide-acrylic acid copolymer (92 mol percent acrylamide), glyoxal reacted

The procedure of Example 1 is followed, except that the monomers employed are 92 g. of acrylamide and 8 g. of acrylic acid, the two monomers are premixed with the water, and this solution and the catalyst solution are added concurrently to the refluxing aqueous isopropanol. The copolymer [composed of —CH$_2$CH(CONH$_2$)— and —CH$_2$CH(COOH)— linkages] is reacted with glyoxal as shown in Example 1. A water-soluble thermosetting anionic polymer containing —CHOHCHO substituents is obtained. The ratio of the —CHOHCHO substituents to the amide substituents present in the product is about 0.12:1. An aqueous solution of the product is intially clear, but becomes hazy on standing at room or elevated temperature of 2%–5% solids.

EXAMPLE 7

Polyacrylamide-glyoxal resin, sodium bisulfite reacted

To a solution of 71 g. (1 mol) of polyacrylamide (molecular weight 10,000) in water at pH 7.5 is added a neutral buffer and then 36.6 g. (0.25 mol) of a 40% by weight solution of glyoxal in water. The solution is treated as shown in Example 1 to cause partial reaction of the glyoxal. The solution is adjusted to pH 4.5 with hydrochloric acid and to it is added 8.5 g. of sodium bisulfite. The pH of the solution is then readjusted to 4.5 with hydrochloric acid.

A water-soluble anionic thermosetting polymer is obtained substantially composed of linkages having the theoretical formulae —CH₂CH(CONH₂)—,

—CH₂—CH(CONHCHOHCHO)— and —CH₂—CH(CONHCHOHCHOHSO₃Na)—. The ratio of —CHOHCHO to amide substituents in the product is about 0.12:1.

EXAMPLE 8

Polyacrylamide-3-(dimethylamino)propylamine-glyoxal copolymer

To 71 g. (1 mol) of polyacrylamide (molecular weight 10,000) dissolved in 200 g. of ethylene glyoxal is added 20 g. (0.2 mol) of 3-(dimethylamino)propylamine and the mixture is heated in a flask provided with an ammonia outlet and trap at 110° C. until 0.2 mol of NH₃ is evolved. The polymer is recovered by precipitation of the polymer from two liters of isopropyl alcohol. The polymer (87 g.) is dissolved in water and is reacted with 36.6 g. of 40% aqueous glyoxal (0.25 mol) by the method of Example 1.

The product is a water-soluble thermosetting cationic polymer. The initial aqueous solution of the product is clear, and develops a colloidal haze on standing at room temperature and 2%–5% solids.

EXAMPLE 9

Vinylsulfonic acid-acrylamide-acrylonitrile copolymer, glyoxal reacted

Into a closed reactor containing a stirrer, thermometer, nitrogen gas inlet tube and dropping funnel are introduced (by the method of U.S. Patent No. 3,164,574) 20 g. of a 50% by weight aqueous solution of sodium vinylsulfonate, 1 g. of potassium persulfate, and 0.5 g. of Na₂S₂O₅, all air being swept from the reactor by a stream of nitrogen gas. The mixture is heated to 40° C. with stirring. There are then added dropwise over two hours a solution of 40 g. of sodium vinylsulfonate solution in 40 g. of water at pH 4.5 and a solution of 40 g. of acrylamide plus 10 g. of acrylonitrile in 100 g. of water. There is then added dropwise over ½ hour 50 g. of water containing 0.5 g. of potassium persulfate and 0.25 g. of Na₂S₂O₅. Stirring is continued for 7 hours at 80° C. The polymer is precipitated by addition of methanol, and the precipitate is washed with methanol and dried. The polymer is substantially composed of linkages having the theoretical formulae.

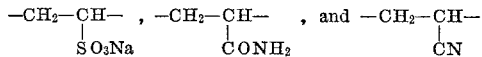

71 g. of the polymer is dissolved in 630 g. of water. The solution is adjusted to pH 7.5 by addition of sodium hydroxide and buffer, and 36.0 g. of a 40% aqueous solution of glyoxal is added. Partial reaction between the polymer and the glyoxal is effected as shown in Example 1.

A water-soluble anionic thermosetting polymer containing —CHOHCHO substitutents is obtained. Dilute solutions of this polymer are often hazy as prepared.

EXAMPLE 10

Acrylamide-(p-vinylphenyl)trimethyl ammonium chloride copolymer, glyoxal reacted 32 g. (0.45 mol) of acrylamide and 7.6 g. (0.05 mol) of p-(chloromethyl) styrene are brought to reflux in 200 g. of acetone and 1.45 g. of benzoyl peroxide are added. After 3 hours of refluxing, the precipitated polymer is collected and air-dried. To 50 g. of a 10% by weight solution of the polymer in water is added 7.0 g. of 40% aqueous trimethylamine. After the initial exotherm the solution is warmed at 40° C. until the pH falls below 7.0. The resulting polymer is substantially composed of linkages having the theoretical formulae —CH₂—CH(CONH₂)— and 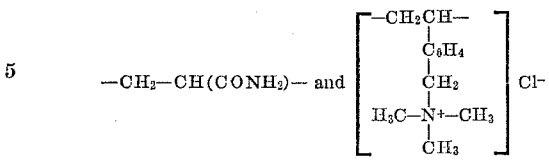

The solution is diluted to 100 ml. with water and to it is added 15.0 g. of 40% aqueous glyoxal solution. The pH is adjusted to 8.0 with sodium carbonate and the glyoxal is partially reacted with the polymer according to the method of Example 1.

A water-soluble cationic thermosetting polymer containing —CHOHCHO substituents is obtained, which becomes hazy on standing at 2%–5% solids.

EXAMPLE 11

The following illustrates a preferred method for manufacturing wet-strength paper according to the present invention.

To an aqueous pulp at 0.6% consistency and pH 6.5 composed of bleached softwood kraft papermaking fibers beaten to a Canadian standard freeness of 550 ml. is added sufficient of the thermosetting cationic resin solution of Example 1 as a 10% solution having a pH of 4.0 to provide 1% of the acrylamide-diallyldimethyl ammonium chloride-glyoxal polymer based on the dry weight of the fibers. The pulp is adjusted to pH 6.5 and is stirred briefly to permit the polymer to be adsorbed by the fibers. The fibers are formed into a water-laid web having a basis weight of 50 lbs. (25" x 40"/500 ream) in a Nash handsheet machine. The web is pressed between blotters and dried for 1 minute on a rotary laboratory drum drier having a drum temperature of 240° F.

The resulting paper after 15 minutes of immersion in water having a temperature of 20° C. and a pH of 7 has a wet strength of 8.0 lb./inch.

The paper was unusually bright in appearance, because of the absence of coloration in the wet strength resin solution.

EXAMPLE 12

The following illustrates the comparative effect of the molar proportion of glyoxal which is added to the polymer solution on the efficiency of the resin for wet-strengthening purposes.

The procedure of Example 1 is repeated except that the amount of glyoxal which is added is as shown in the table below, and the resin is added to an aqueous suspension of cellulose paper-making fibers, as is shown in Example 15. In each instance 1.0% of resin is added based on the dry weight of the fibers. Results are as follows.

| Run: | Mols glyoxal added [1] | Mols glyoxal reacted [1,2] | Wet strength, lb./inch |
|---|---|---|---|
| 1 | 1.0 | 0.50 | 8.3 |
| 2 | 0.50 | 0.25 | 8.8 |
| 3 | 0.25 | 0.12 | 9.05 |
| 4 | 0.17 | 0.08 | .88 |
| 5 | 0.12 | 0.06 | 7.05 |
| 6 | ([3]) |  | <0.8 |

[1] Per mol of acrylamide in copolymer.
[2] Values are approximate, based on dialysis results.
[3] No glyoxal added.

The data indicate that the most efficient polymer is obtained when the amount of glyoxal which is added is about ¼ mol per mol of acrylamide in the copolymer (run 3). Since of this amount of glyoxal only about one-half reacts with this copolymer, the copolymer actually contains only about ⅛ mol of glyoxal per mol of combined acrylamide therein, so that the ratio of

—CHOHCHO substituents the amide substituents is about 0.12:1.

The data also show that good results are obtained when the amount of glyoxal which is added is in excess of about 0.12 mol per mol of amide substituents. This means that good results are obtained when the polymer has a reacted content of more than 0.06 mol of glyoxal per mol of acrylamide, i.e., when the ratio of the —CHOHCHO substituents to the amide substituents of the polymer is in excess of 0.06:1.

EXAMPLE 13

The following illustrates the effect on the wet strengthening properties of the copolymer of the number of quaternary ammonium substituents therein.

The procedure of Example 1 is repeated except that the acrylamide:diallyldimethyl ammonium chloride (AM:DADM) ratio is varied as is shown in the table below, and the wet strengthening properties of the polymer are determined as shown in Example 11 with the following results.

| | AM:DADM molar ratio | Mols glyoxal added [1] | Wet strength, lb./inch |
|---|---|---|---|
| Run: | | | |
| 1 | 93:7 | 0.25 | 8.3 |
| 2 | 95:5 | 0.25 | 8.2 |
| 3 | 97.5:2.5 | 0.25 | 8.3 |

[1] Per mol of acrylamide in copolymer.

The results show that when the copolymer contains a sufficient amount of ionic linkages to cause the copolymer to be adsorbed on the fibers, larger amounts of the ionic substituents do not confer a significantly greater benefit upon the wet strength developed by the paper.

EXAMPLE 14

The following illustrates the wet-strengthening effect of different amounts of a preferred polymer of the present invention and the effect of the pH at which the paper is made.

The procedure of Example 11 is repeated, except that the pulp used is composed of bleached softwood kraft fibers, and the amount of polymer added is as shown in the table below. Results are as follows.

| | Percent polymer added [1] | Pulp, pH [2] | Wet strength, lb./in. |
|---|---|---|---|
| Run: | | | |
| 1 | 1.0 | 4.5 | 9.5 |
| 2 | 1.0 | 6.0 | 8.65 |
| 3 | 1.0 | 7.0 | 8.3 |
| 4 | 1.0 | 8.0 | 6.25 |
| 5 | 0.5 | 6.0 | 6.9 |
| 6 | 0.5 | 7.0 | 6.6 |
| 7 | 0.25 | 6.0 | 4.5 |
| 8 | 0.25 | 7.0 | 4.2 |

[1] Based on the dry weight of the fibers.
[2] After addition of the polymer.

The results show that while the polymer performs most efficiently at an acid pH, it imparts very satisfactory wet strength values when applied to neutral pulp. In the above example, the wet strength developed by the polymer at pH 7.0 is 87% of the wet strength developed at pH 4.5.

EXAMPLE 15

The following illustrates the rapidity with which the polymers of the present invention develop their wet-strengthening properties, even at low temperatures.

The procedure of Example 11 is repeated except that of the handsheets prepared, several are dried at room temperature (by hanging for 165 minutes at 75° F. and 30% relative humidity) and other sheets are dried for 1 minute on a laboratory drum drier having a drum temperature of 100° C. All sheets have closely similar wet-strength values. Results are as follows, based on averaged values.

| | Drying temperature, ° C. | Wet strength, lb./inch |
|---|---|---|
| Run No.: | | |
| 1 | 22 | 7.7 |
| 2 | 100 | 8.2 |

Both sets of sheets lose substantially all their wet strength after 1 hour of immersion in water at pH 10.5 and 40° C., which shows that the same type of wet-strength bonds develop in each instance.

EXAMPLE 16

The following illustrates the pulping of wet-strength broke according to the present invention.

A 50-g. portion of the wet-strength paper produced according to Example 11 is slurried in 1000 cc. of water at 25° C. and pH 9 for 30 minutes. At the end of that time the fiber-polymer-fiber bonds in the paper have extensively loosened. The slurry is then mechanically pulped by slushing for a few minutes in a laboratory Valley beater. Good quality paper is obtained when the resulting pulp is diluted to 0.6% consistency, sheeted on a British handsheet machine at 50 lb. basis weight and dried on a laboratory drum drier having a drum temperature of 240° F.; however, the resulting paper possesses substantially no wet strength.

EXAMPLE 17

The following illustrates the wet-strengthening effectiveness of polymers of the present invention on unbleached pulps in various amounts at two pH values.

The procedure of Example 11 is repeated, except that the pulp used is an unbleached kraft pulp and the amounts of polymer added to the fibrous suspension and the papermaking pH are as shown. Results are as follows.

UNBLEACHED SOFTWOOD KRAFT

| | Percent polymer added | Papermaking pH | Wet strength, Lb./inch |
|---|---|---|---|
| Run No.: | | | |
| 1 | 0.25 | 6.0 | 5.7 |
| 2 | 0.50 | 6.0 | 7.6 |
| 3 | 0.75 | 6.0 | 9.2 |
| 4 | 0.25 | 8.0 | 4.5 |
| 5 | 0.50 | 8.0 | 6.35 |
| 6 | 0.75 | 8.0 | 7.65 |

UNBLEACHED HARDWOOD KRAFT

| | Percent polymer added | Papermaking pH | Wet strength, Lb./inch |
|---|---|---|---|
| 7 | 0.25 | 6.0 | 3.1 |
| 8 | 0.50 | 6.0 | 4.8 |
| 9 | 0.75 | 6.0 | 5.8 |
| 10 | 0.25 | 8.0 | 1.8 |
| 11 | 0.50 | 8.0 | 3.4 |
| 12 | 0.75 | 8.0 | 4.4 |

EXAMPLE 18

The following illustrates an apparently dry particulate free-flowing blend of a cationic vinylamide non-thermosetting polymer and glyoxal, the conversion of the blend into a wet-strength thermosetting polymer, and the preparation of wet-strength paper therefrom.

An aqueous solution of a substantially linear non-thermosetting cationic polyacrylamide (prepared by co-polymerizing acrylamide with diallyldimethyl ammonium chloride in 90:10 molar ratio) is evaporated to dryness under reduced pressure and the recovered friable polymer is ground and screened to 100%–40 mesh. Glyoxal hydrate (80% glyoxal content) is pulverized and similarly screened. The glyoxal hydrate is a free-flowing apparently dry powder. To 70 g. of the thus prepared powdered polymer is added 18 g. of the powdered glyoxal hydrate, which acts as latent thermosetting agent. The mixture is thoroughly shaken in a stoppered glass jar, and the resulting free-flowing apparently dry powder (which however contains 12.3% of water as hydrate) is allowed to stand two months at room temperature, at the end of which time it is substantially unchanged.

To 10 g. of water at 25° C. is added 2.2 g. of the above-described blend and the resulting solution is adjusted to pH 6.5. The solution is allowed to stand over night, and is then diluted to 400 cc. with water. Strips of water-leaf paper are impregnated with this solution, washed in water to remove free (unreacted) glyoxal, and dried at 105° C. for 1 minute. The resulting strips possess satisfactory wet strength.

EXAMPLE 19

The following illustrates the preparation of a dry, free flowing polymer-glyoxal blend according to the present invention containing a neutral inert agent which maintains the blend dry.

To 70 g. of the dried, ground and screened polymer of Example 18 is added 18 g. of powdered dry glyoxal hydrate and 10 g. of finely powdered anhydrous Glauber's salt ($Na_2SO_4$) to maintain the composition dry in the event of access of humid air. The presence of the Glauber's salt does not affect the wet strengthening efficiency of the blend.

The mixture is placed in a bag of 2-mil polyethylene film which is heat-sealed and is maintained in a humid atmosphere at 100° F. for 2 months. The composition does not deteriorate more than negligibly during this interval.

EXAMPLE 20

The following illustrates the superior wet strengthening efficiency of the glyoxal reacted polyvinylamides of the present invention in colloidal state.

A sample is removed from a freshly-prepared clear aqueous solution of the glyoxal-reacted acrylamide-diallyl dimethyl ammonium copolymer of Example 1, and the efficiency of the polymer therein is determined by the method of Example 1. A second sample is removed at the same time. The sample diluted to 5% solids with water, and is allowed to age at room temperature until it develops a colloidal haze. The wet strengthening efficiency of the resin therein is then determined in the same way. Results are as follows.

| State | Percent polymer added [1] | Web tensile strength [2] Found [3] | Percent increase |
|---|---|---|---|
| Initial (non-colloidal) | 0.25 | 3.9 | |
| Aged (colloidal) | 0.25 | 4.5 | 15.0 |

[1] Based on dry weight of fibers.
[2] Lb./inch.
[3] By TAPPI method.

EXAMPLE 21

The following illustrates the preparation of a polymer solution which is either hazy when prepared or which develops a haze very rapidly.

A reaction mixture is formed from 75 g. of water, 35 g. of isopropyl alcohol, and 5 g. of diallyl dimethyl ammonium chloride. To this solution at reflux are added simultaneously but separately over two hours a solution of 80 g. of acrylamide in 80 g. of water, 0.5 g. of ammonium sulfate in 100 g. of water and 20 g. of methyl methacrylate. The reaction mixture is refluxed for two hours and then cooled and adjusted to pH 7.5. There is then added 36 g. of a 40% aqueous solution of glyoxal in water, and the glyoxal is reacted as has been shown in Example 1. The product solution is hazy when diluted to 10% solids with water, and remains hazy when further diluted to 1% solids.

EXAMPLE 22

The following illustrates a polymer according to the present invention containing spacing linkages.

To a 1-liter 3-necked flask are charged 15.9 g. (0.18 mol) of vinyl acetate, 8.0 g. (0.05 mol) of diallyl dimethyl ammonium chloride, 160 g. of water and 64 g. of isopropyl alcohol. The solution is stirred and heated to 75° C. and there are added simultaneously but separately over a two hour period of a solution of 134 g. (1.89 mol) of acrylamide in 150 g. of water and a solution of 0.8 g. of ammonium persulfate in 160 g. of water. The temperature of the solution gradually increases to 85° C. during the addition of the acrylamide and the catalyst. After the addition is complete, the solution is refluxed for 1.5 hours. The resulting 23.2% polymer solution is then cooled and reacted with 0.25 mol of glyoxal by the method of Example 1. The solution is clear, colorless and free from haze.

EXAMPLE 23

The effect of sodium bisulfite as an agent which stabilizes the agent against gelation is shown by the following.

An aqueous solution of the reaction product of glyoxal with an acrylamide-diallyldimethyl ammonium copolymer, such as is disclosed in Example 1, is diluted to 9% solids by addition of water and divided into portions. To each is added $NaHSO_3$ (powdered) in amounts shown below. The samples are then stored at 73° F. and observed daily, and the number of days are noted which are required for the samples to gel. Results are as follows.

| Percent $NaHSO_3$ added [1]: | Days to gel at 73° F. |
|---|---|
| None | 8 |
| 5 | 16 |
| 10 | 27 |
| 15 | >30 |
| 20 | >180 |

[1] Based on weight of polymer.

EXAMPLE 24

The following illustrates the commercial manufacture of paper according to the present invention, with rapid thermosetting of the polymer.

To a pulp of cellulose papermaking fibers at pH 5.5 in the headbox of a papermaking machine is metered a 5% aqueous solution of the polymer of Example 1 at a rate sufficient to provide 0.3% of polymer based on the dry weight of the fibers. The pulp is sheeted at the basis weight appropriate for toilet tissue. The wet web is dried on a Yankee drier heated by steam at about 220° F. The dwell time of the tissue on the drier is about 10–12 seconds. On leaving the drier the paper possesses very satisfactory wet and dry tensile strength. About half this strength disappears when the paper is soaked in water at room temperature for 30 minutes.

We claim:

1. An ionic water-soluble vinylamide polymer having sufficient glyoxal-reactive amide substituents and

—CHOHCHO substituents to be thermosetting, the ratio of the number of said —CHOHCHO substituents to the number of said glyoxal-reactive amide substituents being in excess of 0.06:1.

2. An aqueous solution of the polymer of claim 1 in colloidal state.

3. A polymer according to claim 1 having a molecular weight below 25,000.

4. A cationic polymer according to claim 1.

5. A cationic water-soluble about 99:1 to 75:25 molar ratio acrylamide:diallyldimethyl ammonium chloride polymer according to claim 1.

6. A cationic water-soluble about 99:1 to 50:50 molar ratio methacrylamide:2-methyl-5-vinylpyridine polymer according to claim 1.

7. An anionic water-soluble polymer according to claim 1 substantially composed of (A) —$CH_2$—CH($CONH_2$)— linkages, (B) —CH$_2$—CH(CONHCHOHCHO)— linkages, and (C)

—CH$_2$—CH(CONHCHOH—CHOHSO$_3$M)— linkages wherein M represents H or an alkali metal, the number of (B) and (C) linkages being sufficient to render said polymer thermosetting and anionic.

8. An anionic water-soluble polymer according to claim 1 substantially composed of (A)

—CH$_2$CH(CONH$_2$)

linkages, (B) —CH$_2$CH(CONHCHOHCHO) linkages, and (C) —CH$_2$—CH(COOH) linkages, the number of (B) and (C) linkages being sufficient to render said polymer thermosetting and anionic.

9. A cationic water-soluble vinylurea polymer having glyoxal-reactive urea substituents and sufficient

—CHOHCHO substituents to be thermosetting, the ratio of the number of said —CHOHCHO substituents to the number of said glyoxal-reactive urea substituents being in excess of 0.06:1.

10. An ionic water-soluble vinylamide polymer having sufficient —CHOHCHO substituents to be thermosetting, the ratio of the number of said substituents to the number of amide substituents of said polymer being in excess of 0.06:1, a film of said polymer laid down from water solution on a glass plate and heated for 5 minutes at 105° C. becoming thermoset and insoluble in water at room temperature.

11. A dry free-flowing particulate blend consisting essentially of an ionic aldehyde-reactive hydrophilic vinylamide polymer and glyoxal hydrate as latent thermosetting agent therefor, the amount of said glyoxal hydrate being sufficient when said blend is dissolved in water to form an ionic water-soluble vinylamide polymer having sufficient glyoxal-reactive amide substituents and —CHOHCHO substituents to be thermosetting, the ratio of the number of said —CHOHCHO substituents to the number of said glyoxal-reactive amide substituents of said latter polymer being in excess of 0.06:1.

12. A blend according to claim 11 comprising powdered sodium sulfate as agent maintaining said blend dry.

13. A process of making wet-strength paper which comprises adsorbing an effective amount as latent wet-strengthening agent of a polymer according to claim 1 on cellulose paper-making fibers in aqueous suspension at a pH between 4.5 and 8, forming said suspension into a water-laid web, and drying said web thereby developing the wet-strengthening properties of said polymer.

14. Wet-strength paper composed of water-laid cellulose paper-making fibers bonded together by an adsorbed and at least partially cellulose-reacted content of a polymer according to claim 1, said polymer also being in thermoset state.

15. Wet-strength paper according to claim 14 having a pH between 6 and 8.

References Cited

UNITED STATES PATENTS

| | | | |
|---|---|---|---|
| 2,381,020 | 8/1945 | Wilkes et al. | 260—72 |
| 2,886,557 | 5/1959 | Talet | 260—72 |
| 2,963,396 | 12/1960 | Padbury et al. | 162—168 |
| 3,019,156 | 1/1962 | Lundberg et al. | 162—168 |
| 3,077,430 | 2/1963 | Moore | 162—168 |
| 3,245,868 | 5/1966 | Espenmiller et al. | 162—8 |
| 2,616,818 | 11/1952 | Azorlosa | 117—155 |

S. LEON BASHORE, Primary Examiner

F. FREI, Assistant Examiner

U.S. Cl. X.R.

162—168; 260—29.4, 72

UNITED STATES PATENT OFFICE
CERTIFICATE OF CORRECTION

Patent No. 3,556,932        Dated   January 19, 1971

Inventor(s) Anthony Thomas Coscia and Laurence Lyman Williams

It is certified that error appears in the above-identified patent and that said Letters Patent are hereby corrected as shown below:

Column 2 line 60 at beginning of sentence delete "or ionic".
Column 3 line 13 after e.g., "4 to 10" should be -- 4 to 40 -
Column 4 line 48 after their "simples" should be -- simplest
Column 8 line 20 after is "97.8:2:2" should be -- 97.8:2.2 --
Column 9 line 15 first word "Acryamide" should be -- Acrylam:
Column 10 line 40 "-CH$_2$CH(CONHCHOHCHO)" should be -- -CHOHCH(
Column 10 line 42 first word "linkages" should be -- sub-stituents --; Column 10 line 55 after containing "-CHOHCHO s(
stituents" should be -- -CH$_2$CH(CONHCHOHCHO) linkages --.
Column 12 line 62 last column in table ".88" should be -- 8.8
Column 13 line 53 second column in table "05" should be
-- 0.5 --.

Signed and sealed this 15th day of June 1971.

(SEAL)
Attest:

EDWARD M.FLETCHER,JR.                WILLIAM E. SCHUYLER, JR.
Attesting Officer                    Commissioner of Patents